(12) United States Patent
Linden-Henry (10) Patent No.: US 7,059,860 B2
(45) Date of Patent: Jun. 13, 2006

(54) METHOD AND TOOLS FOR TEACHING READING FOR TEST-TAKING

(75) Inventor: Nancy E. Linden-Henry, Shady Shores, TX (US)

(73) Assignee: Book and Brain Consulting, Inc., Shady Shores, TX (US)

( * ) Notice: Subject to any disclaimer, the term of this patent is extended or adjusted under 35 U.S.C. 154(b) by 291 days.

(21) Appl. No.: 10/448,146

(22) Filed: May 29, 2003

(65) Prior Publication Data

US 2004/0241626 A1    Dec. 2, 2004

(51) Int. Cl.
*G09B 17/00* (2006.01)
(52) U.S. Cl. ............... 434/178; 434/322; 434/156
(58) Field of Classification Search ........... 434/322, 434/353, 323, 178, 156, 169
See application file for complete search history.

(56) References Cited

U.S. PATENT DOCUMENTS 6,361,322 B1 *   3/2002   Linden Henry ............. 434/178
6,361,326 B1 *   3/2002   Fontana et al. ............. 434/322

* cited by examiner

*Primary Examiner*—Monica Carter
*Assistant Examiner*—Aileen Chyn
(74) *Attorney, Agent, or Firm*—Baker Botts L.L.P.

(57) ABSTRACT

Teaching reading for test-taking is included where a reading passage and questions are displayed. The questions include an evidence set and a thinking set, where the evidence set includes one or more evidence questions designed to be answered by referring to the reading passage, and where the thinking questions are designed to be answered by analyzing at least a portion of the reading passage. A marking input is received including at least one marking corresponding to a portion of the reading passage, where the at least one marking includes at least one indicator. Each indicator indicates a category of text associated with each marked portion of the reading passage. A determination is made as to whether the reading passage includes an appropriate portion of the reading passage. A response is evaluated according to the determination.

20 Claims, 3 Drawing Sheets

METHOD AND TOOLS FOR TEACHING READING FOR TEST-TAKING

TECHNICAL FIELD OF THE INVENTION

This invention relates generally to the field of teaching aides and more specifically to a method and tools for teaching reading.

BACKGROUND OF THE INVENTION

Many students do not perform well on standardized tests. While coaching for taking standardized tests such as the SAT and ACT may be available, students typically do not learn effective techniques for reading material associated with these tests. This may cause students to view standardized reading tests as hostile, rather than user-friendly. As a result, students may become overwhelmed and may allow fear and anxiety to affect their performance resulting in poor scoring. Consequently, known techniques for teaching test-taking may be unsatisfactory in certain situations.

SUMMARY OF THE INVENTION

In accordance with the present invention, disadvantages and problems associated with previous techniques for teaching reading may be reduced or eliminated.

According to one embodiment, a method for teaching reading for test-taking is included where a reading passage and questions are displayed. The questions include an evidence set and a thinking set, where the evidence set includes one or more evidence questions designed to be answered by referring to the reading passage, and where the thinking questions are designed to be answered by analyzing at least a portion of the reading passage. A marking input is received including at least one marking corresponding to a portion of the reading passage, where the at least one marking includes at least one indicator. Each indicator indicates a category of text associated with each marked portion of the reading passage. A determination is made as to whether the reading passage includes an appropriate portion of the reading passage. A response is evaluated according to the determination.

Certain embodiments of the invention may provide one or more technical advantages. A technical advantage of one embodiment may be that by classifying test questions as either book questions or brain questions, a student may better understand the objectives of each question and may be better prepared to apply the skills necessary to answer the classified questions. Another technical advantage of one embodiment may be that by answering book questions first, a student may utilize similar skills to answer each question, providing for a more efficient way of answering standardized test questions. Yet another technical advantage of one embodiment may be that by marking the reading passage as the student answers the questions, the student may gain confidence as the marked portions may provide validation that a correct answer is found.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
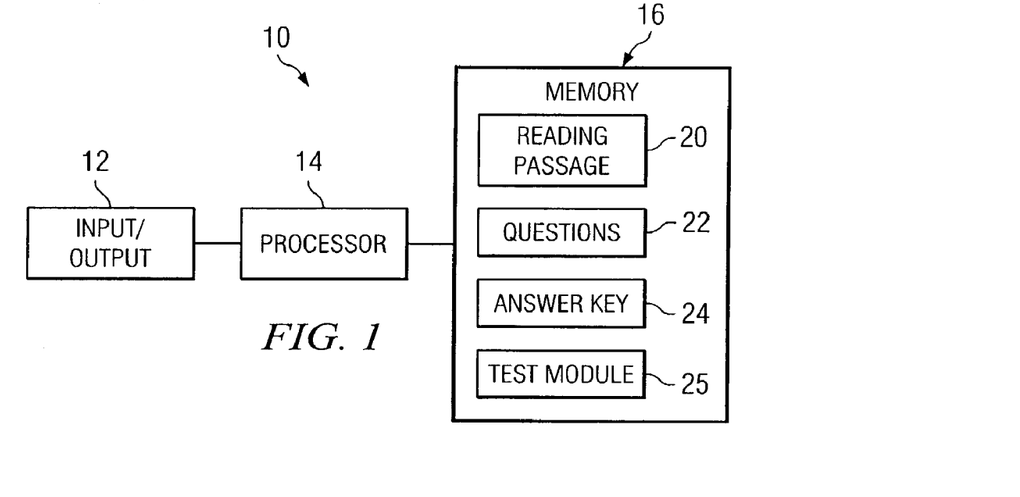
FIG. 1 is a block diagram of one embodiment of a computer system that may be used in accordance with the present invention.
Figure 2:
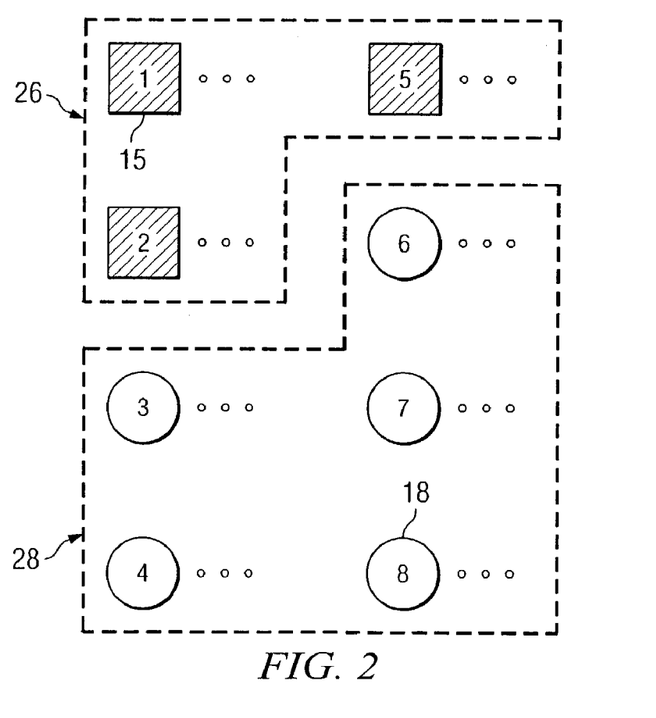
FIG. 2 is an illustration demonstrating one embodiment of a question labeling technique that may be used in accordance with the present invention.
Figure 3A:
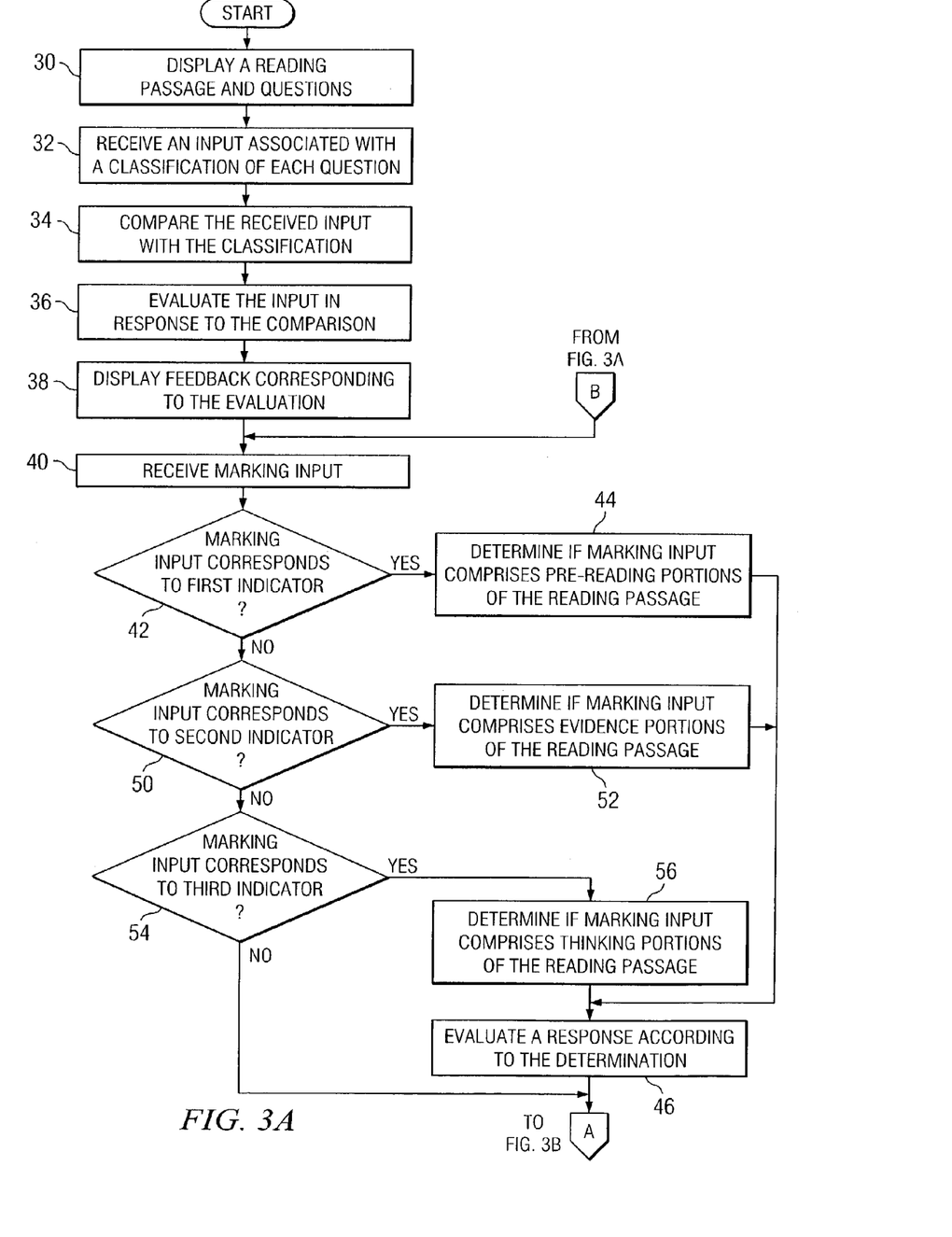
FIGS. 3A and 3B illustrate a flowchart demonstrating one embodiment of a method that may be used in accordance with the present invention.
Figure 3B:
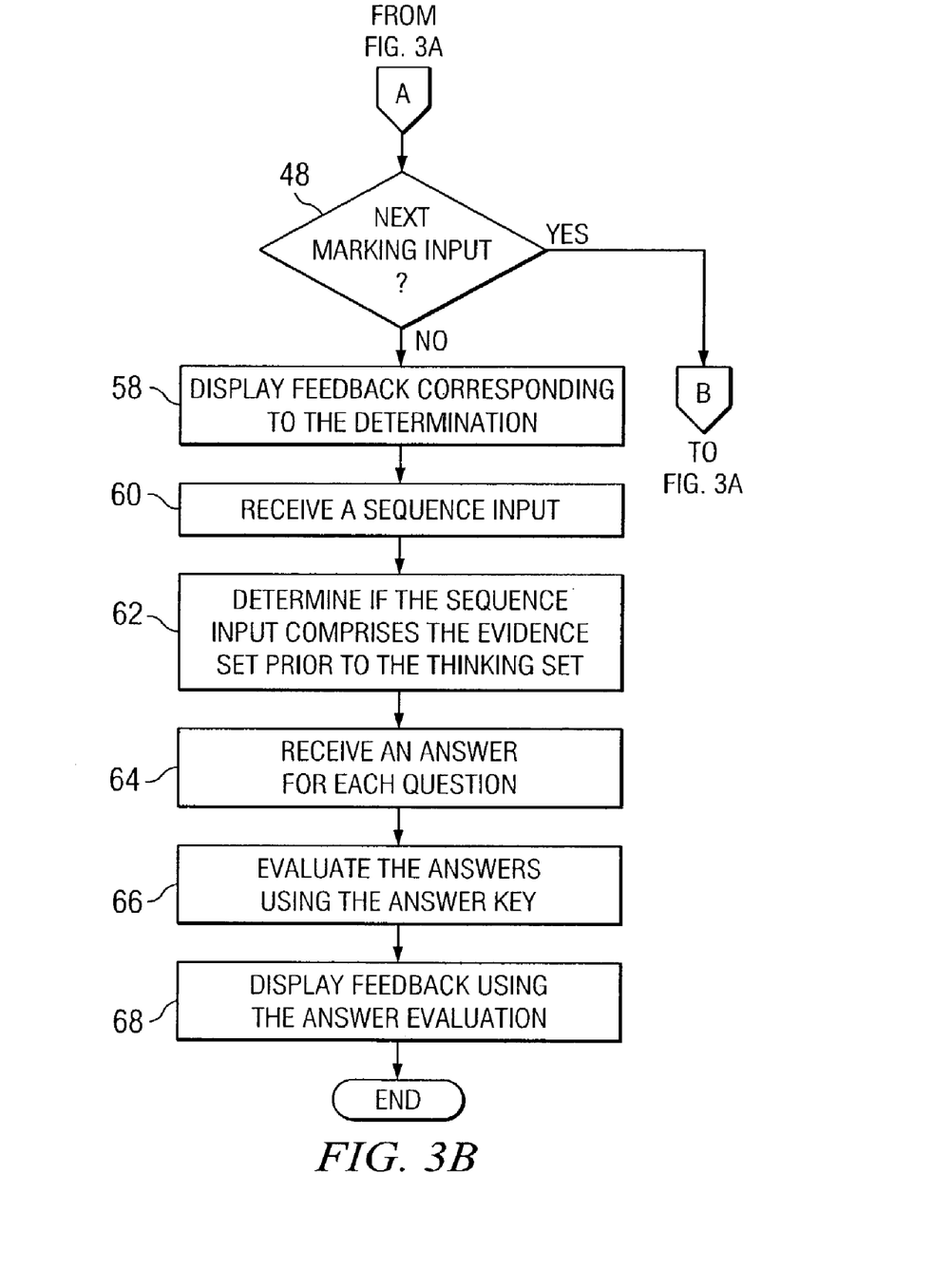

Embodiments of the present invention and its advantages are best understood by referring to FIGS. 1 through 3 of the drawings, like numerals being used for like and corresponding parts of the various drawings.

FIG. 1 illustrates a computer system 10 that may be used for teaching reading in accordance with the present invention. Specifically, computer system 10 may comprise a portion of an application for teaching reading. Computer system 10 may be adapted to execute any of the well known MS-DOS, PC-DOS, OS2, UNIX, MAC-OS, and WINDOWS operating systems or any other suitable operating system. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Computer system 10 includes an input/output module 12, a processor 14, and a memory 16 coupled as shown in FIG. 1. Input/output module 12 receives input from a user and communicates output to the user. Input/Output module 12 may include devices such as a keyboard, a mouse, a touch screen, a pointing device, a scanner, a printer, disk drives, a display, communication links, or any other suitable device.

Processor 14 executes programs that may be stored at memory 16. Memory 16 may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding. Memory 16 may be coupled to processor 14 and input/output module 12 using a bus connection, one or more local area networks (LANs), metropolitan area networks (MANs), wide area networks (WANs), a global computer network such as the Internet, or any other appropriate wire line, wireless, or other links.

Memory 16 includes a reading passage 20, questions 22, an answer key 24, and a test module 25. According to one embodiment, reading passage 20, questions 22, and answer key 20 may be stored in one or more data files, and test module 25 may be stored in one or more executable files. Memory 16 may include other or additional modules without departing from the scope of the invention.

Reading passage 20 includes one or more paragraphs of text. Reading passage 20 may include persuasive, descriptive, expositive, or any other type of writing. Reading passage 20 may vary in length and difficulty according to the user's reading level. According to one embodiment, memory 16 may include one or more reading passages 20.

Questions 22 includes objective questions associated with the reading passage 20. According to one embodiment, the objective questions comprise multiple-choice questions corresponding to one or more reading passages 20. For example, a reading passage 20 may be associated with a set of multiple-choice questions of questions 22. Any number of questions 22 may be associated with a specific reading passage 20 without departing from the scope of the invention. Additionally, questions 22 may be stored sequentially or in any other suitable order without departing from the scope of the invention.

Answer key 24 includes information about each question of questions 22 and the correct or best answer choice for each question. "Each" as used in this document refers to each member of a set or each member of a subset of a set. Answer key 24 may classify each of the questions 22 according to the skill necessary to answer the question. According to one embodiment, each question may be classified as either an evidence question or a thinking question, where evidence questions comprise book questions and thinking questions comprise brain questions. Book questions are designed to be answered by referring to the text of reading passage 20, and brain questions are designed to be answered by analyzing at least a portion of reading passage 20. For example, a user may answer a book question by locating a portion of the reading passage where the answer to the book question may be explicitly stated. In contrast, a user may answer a brain question by employing higher-level analysis skills, such as synthesizing or evaluating information, drawing inferences, and making judgments. Answers to brain questions are not found directly stated in reading passage 20.

Answer key 24 may also classify portions of a reading passage 20 according to a category of text. According to one embodiment, portions of reading passage 20 may be classified according to three categories: a pre-reading category, an evidence category, and a thinking category.

The pre-reading category is associated with text that a user may recognize easily from reading passage 20 such as titles, subtitles, underlined, bolded, or italicized words, and graphics. The text in the pre-reading category may also include any other portion of passage 20 that may be paid special attention and read slowly such as instructions, or any other suitable text.

For example, the following passage and questions may comprise a portion of a reading passage 20 and questions 22:

The Legend of Chao Meng-fu

Chao lowered his eyes and waited for the old man to continue.

"Your work is even better than what is in the copybook. You may have your silver back. It was your attention to what you were doing that made the difference. The paper was not important."

Chao Meng-fu became a great calligrapher, and his learning experience has become a lesson to all students of calligraphy.

18. The old man gave back the silver Chao paid him because
F) he did not need the money
G) Chao gave him too much silver
H) Chao's teacher was angry about the money
J) the paper was not special.

19. After listening to the legend of Chao Meng-fu, modern students of calligraphy will probably—
A) save their money for special paper
B) ask an old man to help them
C) spend less time listening to their teacher
D) work hard to improve their writing.

As illustrated in the example above, using bold text as an example of a first indicator, a user may mark the title of the passage to indicate that the marked portion of reading passage 20 comprises a pre-reading portion.

The evidence category is associated with text that is directly related to a book question. The text may directly state the information that may be used to answer a book question.

Using the illustrated portion of reading passage above, a user may mark a portion of the passage as follows:

"Your work is even better than what is in the copybook. You may have your silver back. It was your attention to what you were doing that made the difference. The paper was not important."

Having first labeled question 18 as a book question, a user may mark a portion of reading passage 20 using underlining as an example of a second indicator to find the answer to book question 18.

The thinking category is associated with text that may be useful in answering a brain question. The text may include information that may be analyzed to answer a brain question.

Using a selection of the illustrated portion of reading passage 20, a user may mark a portion of the passage as follows:

Chao Meng-fu became a great calligrapher, and his learning experience has become a lesson to all students of calligraphy.

Having first labeled illustrated question 19 as a brain question, a user may mark the passage using italicized text as an example of a second indicator that points to text that may be used to answer illustrated brain question 19.

Portions of reading passage 20 may be classified using more or fewer categories without departing from the scope of the invention.

Test module 25 presents reading passage 20 and questions 22 to a user and receives input from the user. According to one embodiment, test module 25 extracts a reading passage 20 and a corresponding set of questions 22 and receives marking input from the user. The marking input comprises a marking of text that a user selects using an appropriate indicator. The indicators may indicate different categories of text. For example, a user may select a portion of text from the reading passage 20 using a first indicator, such as a yellow highlighter, to indicate that the marked text comprises pre-reading text. A yellow indicator may indicate text that may be read slowly and to which special attention may be paid.

As another example, a user may select another portion of text of the reading passage 20 using a second indicator, such as a green highlighter, to indicate that the text marked comprises evidence text. The green indicator may indicate text that includes an answer to a book question. The green color may be used to represent the activity associated with book questions, for example, "go and find." As yet another example, a user may select another portion of text of the reading passage 20 using a third indicator, such as a red highlighter, to indicate that the text marked comprises analysis text. The red indicator may indicate that a brain answer may be arrived at by analyzing the selected text. The red color may be used to represent the activity associated with brain questions, for example, "stop and think." Any other suitable colors may be used as indicators for marking portions of reading passage 20 without departing from the scope of the invention. Additionally, any other suitable markings may be used for marking text, for example, underlining, shadowing, bolding, and circling.

Test module 25 may provide the user feedback based on the user's performance. For example, test module 25 may provide a test score, a feedback of whether the book questions and the brain questions were correctly identified, and an evaluation of whether the appropriate text was marked using the appropriate indicator. Any other suitable feedback may be provided without departing from the scope of the invention.

Modifications, additions, or omissions may be made to the system without departing from the scope of the invention. For example, memory 16 may include additional or fewer modules depending on the application. Additionally, functions may be performed using any suitable logic comprising software, hardware, other logic, or any suitable combination of the preceding.

In summary, system 10 teaches a reading technique that may improve a user's performance in standardized tests by allowing a user to identify the skills necessary to answer questions identified according to whether they are book or brain question. By selecting portions of reading passage 20 according to the category of text that may help the user answer the questions, the user may confirm the correct answer to the book questions and may find support for answering the brain questions. Using the appropriate indicator, green for book questions and red for brain questions, a user may be able to quickly glance at the text and recognize the correct answer.

Other embodiments may include teaching using written materials such as printed tests, student exercise books, teacher's manuals, posters, or any other suitable written or printed material. For example, a poster illustrating a stoplight displaying the colors green for "go and find," yellow for "caution and proceed slowly," and red for "stop and think," may be used to remind a user of the marking text and reading techniques.

As another example of a written material, a teacher's manual may be used as a guide through the highlighting method of reading. For example, the teacher's manual may include any formulation of how reading passage 20 may be highlighted using an indicator for each category of text.

Additionally, the teacher's manual may instruct the order of steps to perform the reading technique. As an example, the teacher's manual may include lesson plans directed toward teaching the reading techniques for test-taking in a specific order. The specific order may include first highlighting the text corresponding to the first category, the pre-reading category. Next, the lesson plan may instruct marking the questions according to their classification as either book or brain questions. The lesson plan may next instruct answering the book questions by using the highlighting of text using the second indicator to aide a reader in finding the answer. After answering the book questions, the lesson plan may instruct answering the brain questions by using highlighting of text using the third indicator. Although a suggested order is described, the lesson plans may be modified to add steps, omit steps, or modify steps according to a particular learning level or time constraints in teaching the reading techniques.

An illustration demonstrating one embodiment of a question labeling technique that may be used in accordance with the present invention is described with reference to FIG. 2. A flowchart demonstrating one embodiment of a method that may be used in accordance with the present invention is described with reference to FIG. 3.

FIG. 2 is an illustration demonstrating one embodiment of a question labeling technique that may be used in accordance with the present invention. According to one embodiment, at least one marker may be used to label each question according to the type of question it is. For example, a mark having a squared shape may be used to mark the book questions, while a mark having a rounded shape may be used to mark the brain questions. According to the illustrated embodiment, a square mark 15 is used to mark the book questions identified in a set of book questions 26, and a round mark 18 is used to mark the brain questions identified in a set of brain questions 28.

Square marks 15 in the set of book questions 26 may be shaded to illustrate that book questions are answered before the brain questions. The marks may be shaded to keep track of the questions that have been answered. Any other suitable labeling and shading technique may be used without departing from the scope of the invention. Additionally, a set of book and brain questions may include more or fewer questions depending on the particular application.

FIG. 3 is a flowchart demonstrating one embodiment of a method that may be used in accordance with the present invention. The method begins at step 30, where a reading passage 20 and questions 22 are displayed. At step 32, an input associated with a classification of each question is received. For example, the input may comprise the classification of each question as either a book question or a brain question. According to the illustrated embodiment, the book questions are marked using a square mark and the brain questions are marked using a round mark.

According to one embodiment, the questions may be marked using any marking that identifies each question as either a book question or a brain question. For example, a check box may be used to mark whether the question is a book or a brain question. A check box corresponding to a book question and a check box corresponding to a brain question may be placed adjacent to the question. The question may be marked by checking the appropriate box according to the classification of the question. For example, if a brain question is being classified, the check box corresponding to the brain category may be marked. If a book question is being classified, the check box corresponding to the book category may be marked.

As another embodiment, the marking may comprise any other selective buttons for displaying a classification. For example, the marking may be performed using a pull-down box, a touch-screen selection, or a pointer-writer. Using these examples, a question may be classified by selecting from a pull-down menu the selection of whether the question is a book or a brain question. In the example of touch-screen selection, the marking may be performed by activating on a touch screen the selection such as by "touching" a button for book when a question is a book question. Other technologies may use a pointer-writer, where a question may be classified using a pointer to "write" on the screen the selection, such as when a pointer is used to make a circle mark around the question number to mark a brain question. Any other suitable marking technique may be used in any existing or emerging technologies without departing from the scope of the invention.

The method proceeds to step 34, where the received input is compared with the classification. At step 36, test module 25 evaluates the input in response to the comparison and at step 38, and provides feedback corresponding to the evaluation. According to one embodiment, the feedback may be displayed using input/output module 12.

At step 30, a marking input is received from the user. According to the illustrated embodiment, a marking input comprises at least one marking corresponding to a portion of reading passage 20, where the marking is identified using an indicator that may indicate the category of text associated with each marked portion of the reading passage. For example, a marking input may comprise a portion of reading passage 20 associated with a book question using a second indicator as was more particularly described with reference to FIG. 1.

At step 42, the method determines if the marking input corresponds to the first indicator. According to one embodiment, a user may mark reading passage 20 using a first indicator to indicate that the marked passage comprises a pre-reading portion of reading passage 20.

If the marking input corresponds to the first indicator at step 42, the method proceeds to step 44 to determine if the marked passage comprises pre-reading portions of reading passage 20. For example, the marked passage may be checked to see if it comprises a title, a subtitle, underlined, bolded, or italicized words, and graphics. At step 46, the method evaluates the user response according the determination.

The method proceeds to step 48, where processor 14 determines if there is a next marking input to process. If there is a next marking input to process, the method returns to step 40 where input/output module 12 receives a next marking input.

If the marking input does not correspond to a first indicator at step 42, the method proceeds to step 50 to determine if the marking input corresponds to a second indicator. According to one embodiment, a user may mark reading passage 20 using a second indicator to indicate that the marked passage comprises evidence that can be used to answer to a book question.

If the marking input is determined to correspond to the second indicator at step 50, the method proceeds to step 52 to determine if the marking input comprises evidence portions of reading passage 20. According to the illustrated embodiment, the marked portion is checked to determine if the user selected the appropriate text as evidence portions. Using the example set forth above, the marked portion of the passage is checked to ensure that it comprises an evidence portion, for example, evidence that answers illustrated question 18. The method then returns to step 46 to evaluate the response according to the determination.

If the marking input does not correspond to a second indicator at step 50, the method proceeds to step 54 to determine if the marking input corresponds to a third indicator. According to one embodiment, a user may mark reading passage 20 using a third indicator to indicate that the marked passage comprises text that may be used to answer a brain question.

If the marking input is determined to correspond to the third indicator at step 54, the method proceeds to step 56 to determine if the marking input comprises a thinking portion of reading passage 20. According to the illustrated embodiment, the marked portion is checked to determine if the user selected the appropriate text as a thinking portion. Using the example set forth above, the marked portion of the passage is checked to ensure that it comprises text that may be used to answer question 19. The method then returns to step 46 to evaluate the response according to the determination.

If there is no next marking input to process at step 48, the method proceeds to step 58 where the input/output module 12 displays feedback corresponding to the determination. As was described with reference to FIG. 1, test module 25 determines the feedback and sends it to input/output module 12 for display. According to the illustrated embodiment, the feedback includes information of whether reading passage 20 was correctly marked.

At step 60, a sequence input is received. According to one embodiment, the sequence input corresponds to the sequence in which questions 22 may be answered. For example, a sequence input may comprise ordering book before brain questions. According to the illustrated embodiment, after labeling each of the questions 22 as either a book or a brain question, the sequence input may comprise questions in a set of book questions listed in numerical order followed by questions in a set of brain questions listed in numerical order. Any numerical order within a set of book questions and within a set of brain questions may be used without departing from the scope of the invention.

The method proceeds to step 62, where test module 25 determines if the sequence input comprises the evidence set prior to the thinking set. According to the illustrated embodiment, the evidence set comprises a group of book questions, which may be answered before the thinking set comprising a group of brain questions.

At step 64, input/output module 12 receives an answer for each question 22 and at step 66 the answers are evaluated using answer key 24. Test module 25 evaluates each answer received to determine a test score. The method proceeds to step 68 where input/output module 12 displays feedback using the answer evaluation determined at step 66. The feedback displayed may include a cumulative score, percentage of correct answers, problem areas detected, or any other information suitable for providing information about test performance and the mastery of reading techniques. After feedback is displayed at step 68, the method terminates.

Modifications, additions, or omissions may be made to the method without departing from the scope of the invention. For example, displaying feedback corresponding to the evaluation at step 38 may be omitted. As another example, determining if marking input corresponds to the first indicator at step 42 may be performed substantially simultaneously with determining if marking input corresponds to the second indicator at step 50 and the third indicator at step 54. Additionally, steps may be performed in any suitable order without departing from the scope of the invention. For example, receiving sequence input at step 60 may be performed before receiving marking input at step 40.

Certain embodiments of the invention may provide one or more technical advantages. A technical advantage of one embodiment may be that by classifying test questions as either book questions or brain questions, a student may better understand the objectives of each question and may be better prepared to apply the skills necessary to answer the classified questions. Another technical advantage of one embodiment may be that by answering book questions first, a student may utilize similar skills to answer each question, providing for a more efficient way of answering standardized test questions. Yet another technical advantage of one embodiment may be that by marking the reading passage as the student answers the questions, the student may gain confidence as the marked portions may provide validation that a correct answer is found.

Although an embodiment of the invention and its advantages are described in detail, a person skilled in the art could make various alterations, additions, and omissions without departing from the spirit and scope of the present invention as defined by the appended claims.

What is claimed is:

1. A method for teaching reading for test-taking, comprising:

displaying a reading passage and a plurality of questions at a computer system, the plurality of questions comprising an evidence set and a thinking set, the evidence set comprising one or more evidence questions designed to be answered by referring to the reading passage, the thinking set comprising one or more thinking questions designed to be answered by analyzing at least a portion of the reading passage;

receiving at the computer system a marking input comprising at least one marking corresponding to a portion of the reading passage, the at least one marking comprising at least one indicator, each indicator indicating one of a plurality of categories of text associated with each marked portion of the reading passage;

determining at the computer system if the marked portion of the reading passage comprises an appropriate portion of the reading passage; and evaluating a response according to the determination.

2. The method of claim 1, wherein the plurality of categories of text comprises a pre-reading category, an evidence category, and a thinking category, the pre-reading category associated with a first indicator, the evidence category associated with a second indicator, and the thinking category associated with a third indicator.

3. The method of claim 1, further comprising:

receiving an input associated with a classification of each question of the plurality of questions, the classification corresponding to the one or more question sets;

comparing the received input with the classification; and evaluating the input in response to the comparison.

4. The method of claim 1, further comprising:

receiving a sequence input describing a sequence in which the plurality of questions are answered; and determining if the sequence input corresponds to answering the evidence set prior to the thinking set.

5. The method of claim 1, further comprising labeling the plurality of questions using at least one marker according to the one or more question sets, a first mark corresponding to the evidence questions and a second mark corresponding to the thinking questions, each question associated with an identifier, wherein:

the first mark comprises a first open shape placed about an identifier associated with an evidence question, the first open shape operable to be shaded subsequent to answering the evidence question; and the second mark comprises a second open shape placed about an identifier associated with a thinking question, the second open shape operable to be shaded subsequent to answering the thinking question.

6. A learning tool for teaching reading for test-taking, comprising:

a memory operable to store a reading passage and a plurality of questions, the plurality of questions comprising an evidence set and a thinking set, the evidence set comprising one or more evidence questions designed to be answered by referring to the reading passage, the thinking set comprising one or more thinking questions designed to be answered by analyzing at least a portion of the reading passage; and a processor coupled to the memory and operable to:

display the reading passage and the plurality of questions;

receive a marking input comprising at least one marking corresponding to a portion of the reading passage, the at least one marking comprising at least one indicator, each indicator indicating one of a plurality of categories of text associated with each marked portion of the reading passage;

determine if the marked portion of the reading passage comprises an appropriate portion of the reading passage; and evaluate a response according to the determination.

7. The learning tool of claim 6, wherein the plurality of categories of text comprises a pre-reading category, an evidence category, and a thinking category, the pre-reading category associated with a first indicator, the evidence category associated with a second indicator, and the thinking category associated with a third indicator.

8. The learning tool of claim 6, the processor further operable to:

receive an input associated with a classification of each question of the plurality of questions, the classification corresponding to the one or more question sets;

compare the received input with the classification; and evaluate the input in response to the comparison.

9. The learning tool of claim 6, the processor further operable to:

receive a sequence input describing the sequence in which the plurality of questions are answered; and determine if the sequence input corresponds to answering the evidence set prior to the thinking set.

10. The learning tool of claim 6, the processor is further operable to label the plurality of questions using at least one marker according to the one or more question sets, a first mark corresponding to the evidence questions and a second mark corresponding to the thinking questions, each question associated with an identifier, wherein:

the first mark comprises a first open shape placed about an identifier associated with an evidence question, the first open shape operable to be shaded subsequent to answering the evidence question; and the second mark comprises a second open shape placed about an identifier associated with a thinking question, the second open shape operable to be shaded subsequent to answering the thinking question.

11. A logic for teaching reading, the logic embodied in a medium and operable to:

display a reading passage and a plurality of questions, the plurality of questions comprising an evidence set and a thinking set, the evidence set comprising one or more evidence questions designed to be answered by referring to the reading passage, the thinking set comprising one or more thinking questions designed to be answered by analyzing at least a portion of the reading passage;

receive a marking input comprising at least one marking corresponding to a portion of the reading passage, the at least one marking comprising at least one indicator, each indicator indicating one of a plurality of categories of text associated with each marked portion of the reading passage;

determine if the marked portion of the reading passage comprises an appropriate portion of the reading passage; and evaluate a response according to the determination.

12. The logic of claim 11, wherein the plurality of categories of text comprises a pre-reading category, an evidence category, and a thinking category, the pre-reading category associated with a first indicator, the evidence category associated with a second indicator, and the thinking category associated with a third indicator.

13. The logic of claim 11, the logic further operable to:
receive an input associated with a classification of each question of the plurality of questions, the classification corresponding to the one or more question sets;
compare the received input with the classification; and
evaluate the input in response to the comparison.

14. The logic of claim 11, further operable to:
receive a sequence input describing the sequence in which the plurality of questions are answered; and
determine if the sequence input corresponds to answering the evidence set prior to the thinking set.

15. The logic of claim 11, further operable to label the plurality of questions using at least one marker according to the one or more question sets, a first mark corresponding to the evidence questions and a second mark corresponding to the thinking questions, each question associated with an identifier, wherein:
the first mark comprises a first open shape placed about a identifier associated with an evidence question, the first open shape operable to be shaded subsequent to answering the evidence question; and
the second mark comprises a second open shape placed about a identifier associated with a thinking question, the second open shape operable to be shaded subsequent to answering the thinking question.

16. A teaching tool for teaching reading for test-taking, comprising:
a medium operable to display information; and
a plurality of instructions embodied in the medium, and operable to instruct a user to repeat the following for each question of a plurality of questions, the plurality of questions an evidence set and a thinking set, the evidence set comprising one or more evidence questions designed to be answered by referring to the reading passage, the thinking set comprising one or more thinking questions designed to be answered by analyzing at least a portion of the reading passage:
select a question from the plurality of questions;
read the question;
label the question using at least one marker according to the one or more question sets, a first mark corresponding to the evidence questions and a second mark corresponding to the thinking questions, each question associated with an identifier;
identify one or more pre-reading portions of a reading passage embodied in the medium; and
mark the one or more pre-reading portions of the reading passage with a first indicator.

17. A teaching tool for teaching reading for test-taking, comprising:
a medium operable to display information; and
a plurality of instructions embodied in the medium, and operable to instruct a user to repeat the following for each question of a plurality of questions, the plurality of questions an evidence set and a thinking set, the evidence set comprising one or more evidence questions designed to be answered by referring to the reading passage, the thinking set comprising one or more thinking questions designed to be answered by analyzing at least a portion of the reading passage:
select a question from the plurality of questions;
read the question;
label the question using at least one marker according to the one or more question sets, a first mark corresponding to the evidence questions and a second mark corresponding to the thinking questions, each question associated with an identifier;
identify one or more evidence portions of a reading passage embodied in the medium; and
mark the one or more evidence portions of the reading passage with a second indicator.

18. The teaching tool of claim 17, wherein:
each question is associated with an identifier;
the first mark comprises a first open shape placed about an identifier associated with an evidence question, the first open shape operable to be shaded subsequent to answering the evidence question; and
the second mark comprises a second open shape placed about an identifier associated with a thinking question, the second open shape operable to be shaded subsequent to answering the thinking question.

19. A teaching tool for teaching reading for test-taking, comprising:
a medium operable to display information; and
a plurality of instructions embodied in the medium, and operable to instruct a user to repeat the following for each question of a plurality of questions, the plurality of questions an evidence set and a thinking set, the evidence set comprising one or more evidence questions designed to be answered by referring to the reading passage, the thinking set comprising one or more thinking questions designed to be answered by analyzing at least a portion of the reading passage:
select a question from the plurality of questions;
read the question;
label the question using at least one marker according to the one or more question sets, a first mark corresponding to the evidence questions and a second mark corresponding to the thinking questions, each question associated with an identifier;
identify one or more thinking portions of a reading passage embodied in the medium; and
mark the one or more thinking portions of the reading passage with a third indicator.

20. A learning tool for teaching reading for test-taking, comprising:
a memory operable to store a reading passage and a plurality of questions, the plurality of questions comprising an evidence set and a thinking set, the evidence set comprising one or more evidence questions designed to be answered by referring to the reading passage, the thinking set comprising one or more thinking questions designed to be answered by analyzing at least a portion of the reading passage; and
a processor coupled to the memory and operable to:
display the reading passage and the plurality of questions;
receive an input, the input associated with a classification of each question of the plurality of questions, the classification corresponding to the one or more question sets;
compare the received input with the classification;
evaluate the input in response to the comparison;
receive a marking input comprising a marking of a portion of text with a first indicator corresponding to a pre-reading portion of the reading passage;
determine if the marked portion of text comprises the pre-reading portion of the reading passage;
evaluate a response according to the determination;

receive a marking input comprising a marking of a portion of text with a second indicator corresponding to an evidence portion of the reading passage;
determine if the marked portion of text comprises the evidence portion of the reading passage;
evaluate a response according to the determination;
receive a marking input comprising a marking of a portion of text with a third indicator corresponding to a thinking portion of the reading passage;
determine if the marked portion of text comprises the evidence portion of the reading passage;
evaluate a response according to the determination;
receive a sequence input describing the sequence in which the plurality of questions are answered;
determine if the sequence input corresponds to answering the evidence set prior to the thinking set; and
label the plurality of questions using at least one marker according to the one or more question sets, a first mark corresponding to the evidence questions and a second mark corresponding to the thinking questions, each question associated with an identifier; and wherein:

the first mark comprises a first open shape placed about the identifier associated with an evidence question, the first open shape operable to be shaded subsequent to answering the evidence question; and the second mark comprises a second open shape placed about the identifier associated with a thinking question, the second open shape operable to be shaded subsequent to answering the thinking question.

* * * * *